US010462514B2

(12) United States Patent
Grover

(10) Patent No.: US 10,462,514 B2
(45) Date of Patent: Oct. 29, 2019

(54) INTERACTIVE OVERLAYS TO DETERMINE VIEWER DATA

(71) Applicant: The Nielsen Company (US), LLC, New York, NY (US)

(72) Inventor: Matthew Grover, Draper, UT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/938,049

(22) Filed: Mar. 28, 2018

(65) Prior Publication Data
US 2018/0288473 A1 Oct. 4, 2018

Related U.S. Application Data

(60) Provisional application No. 62/478,185, filed on Mar. 29, 2017.

(51) Int. Cl.
*H04N 7/16* (2011.01)
*H04N 21/431* (2011.01)
*H04N 21/8358* (2011.01)
*H04N 21/45* (2011.01)
*H04N 21/8545* (2011.01)
(Continued)

(52) U.S. Cl.
CPC ... *H04N 21/4312* (2013.01); *H04N 21/23418* (2013.01); *H04N 21/44008* (2013.01); *H04N 21/4516* (2013.01); *H04N 21/4532* (2013.01); *H04N 21/475* (2013.01); *H04N 21/812* (2013.01); *H04N 21/8358* (2013.01); *H04N 21/8545* (2013.01)

(58) Field of Classification Search
None
See application file for complete search history.

(56) References Cited

U.S. PATENT DOCUMENTS 5,600,364 A * 2/1997 Hendricks .............. H04H 20/10
348/E5.002
2001/0032333 A1* 10/2001 Flickinger ............ G06Q 30/02
725/39

(Continued)

OTHER PUBLICATIONS

International Search Report, International Application No. PCT/US2018/024740, dated Jul. 3, 2018, 12 pages.

*Primary Examiner* — William J Kim
(74) *Attorney, Agent, or Firm* — McDonnell Boehnen Hulbert & Berghoff LLP

(57) ABSTRACT

The disclosure provides a method for determining viewer data from interactive overlays. The method includes receiving media content from a content feed. The media device includes a unique identifier (UID). The method also includes determining a media program associated with the received media content based on a fingerprint of the received media content. The method further includes overlaying interactive overlay content onto the media program of the media content in an overlay area. The overlay area corresponds to a spatial position within at least one frame of the media content. The method also includes receiving a feedback response from a viewer based on the interactive overlay content. The method further includes determining viewer information from the feedback response of the viewer. The method further includes associating the viewer information of the feedback response with the UID of the media device.

21 Claims, 6 Drawing Sheets

(51) Int. Cl.
*H04N 21/234* (2011.01)
*H04N 21/44* (2011.01)
*H04N 21/475* (2011.01)
*H04N 21/81* (2011.01)

(56) References Cited

U.S. PATENT DOCUMENTS

| | | | | |
|---|---|---|---|---|
| 2002/0120504 A1* | 8/2002 | Gould | | G06Q 30/02 705/14.2 |
| 2002/0174427 A1* | 11/2002 | Kohno | | G01C 21/3641 725/30 |
| 2003/0078972 A1* | 4/2003 | Tapissier | | H04L 12/1822 709/204 |
| 2003/0083938 A1* | 5/2003 | Smith | | G06Q 30/02 705/14.53 |
| 2003/0171148 A1* | 9/2003 | Weitz | | A63F 13/12 463/40 |
| 2005/0102696 A1* | 5/2005 | Westberg | | H04N 5/44543 725/46 |
| 2007/0050298 A1* | 3/2007 | Givoly | | G06Q 20/123 705/52 |
| 2007/0124756 A1* | 5/2007 | Covell | | G06Q 30/02 725/18 |
| 2007/0240232 A1* | 10/2007 | Pino | | H04N 7/17336 726/28 |
| 2007/0250849 A1* | 10/2007 | Faber | | H04N 7/17318 725/24 |
| 2008/0082510 A1* | 4/2008 | Wang | | H04H 60/37 |
| 2008/0235731 A1* | 9/2008 | Bryant | | H04N 5/44543 725/44 |
| 2009/0113481 A1* | 4/2009 | Friedman | | H04N 5/44543 725/46 |
| 2009/0133090 A1* | 5/2009 | Busse | | H04N 7/163 725/132 |
| 2009/0138805 A1* | 5/2009 | Hildreth | | G06K 9/00335 715/745 |
| 2011/0063317 A1 | 3/2011 | Gharaat et al. | | |
| 2012/0311633 A1* | 12/2012 | Mandrekar | | H04N 5/445 725/40 |
| 2014/0125703 A1* | 5/2014 | Roveta | | G06T 19/006 345/633 |
| 2014/0196085 A1 | 7/2014 | Dunker et al. | | |
| 2014/0223464 A1* | 8/2014 | Moran | | H04N 21/4788 725/12 |
| 2014/0237496 A1* | 8/2014 | Julian | | H04N 21/44213 725/13 |
| 2015/0324827 A1* | 11/2015 | Upstone | | H04N 21/25891 705/14.19 |
| 2016/0234564 A1 | 8/2016 | Holyoak | | |
| 2016/0261917 A1 | 9/2016 | Trollope et al. | | |
| 2016/0360245 A1* | 12/2016 | Sanghavi | | H04N 21/23424 |
| 2016/0366464 A1* | 12/2016 | Rouady | | H04N 21/4312 |
| 2017/0332141 A1* | 11/2017 | Shaw | | H04N 21/4621 |

\* cited by examiner

INTERACTIVE OVERLAYS TO DETERMINE VIEWER DATA

CROSS REFERENCE TO RELATED APPLICATIONS

This U.S. patent application claims priority under 35 U.S.C. § 119(e) to U.S. Provisional Application 62/478,185, filed on Mar. 29, 2017. The disclosure of this prior application is considered part of the disclosure of this application and is hereby incorporated by reference in its entirety.

TECHNICAL FIELD

This disclosure relates to interactive overlays to determine viewer data.

BACKGROUND

Media devices, such as smart televisions (TVs), may access broadcast media content and receive streaming media. Streaming media refers to a service in which media content may be provided to an end user over a telephone line, cable, Internet, and so forth upon request. For example, a viewer may view a movie without having to leave their residence. Also, a viewer may access various types of educational content, such as video lectures, without having to physically attend a school or educational institution.

As the number of media devices continues to increase, video content generation and delivery may similarly increase. With an increase in the use of media devices to access streaming media, content or network providers may distribute contextually-relevant material to viewers that are consuming media content. For example, local broadcasters may include contextually-relevant advertisements and interactive content with media content.

SUMMARY

One aspect of the disclosure provides a method for determining viewer data from interactive overlays. The method includes receiving, at data processing hardware of a media device, media content from a content feed. The media device includes a unique identifier (UID). The method also includes determining, by the data processing hardware of the media device, a media program associated with the received media content based on a fingerprint of the received media content. The method further includes overlaying, by the data processing hardware of the media device, interactive overlay content onto the media program of the media content in an overlay area. The overlay area corresponds to a spatial position within at least one frame of the media content. The method also includes receiving, at the data processing hardware of the media device, a feedback response from a viewer based on the interactive overlay content. The method further includes determining, by the data processing hardware of the media device, viewer information from the feedback response of the viewer. The method further includes associating, by the data processing hardware of the media device, the viewer information of the feedback response with the UID of the media device.

Implementations of the disclosure may include one or more of the following optional features. In some implementations, the interactive overlay content is based on the fingerprint of the received media content. In some examples, the interactive overlay content is randomly selected from an interactive overlay content database in communication with the data processing hardware of the media device. In some configurations, the interactive overlay content is based on the determined media program corresponding to the fingerprint of the received media content. The interactive overlay content may include a prompt for viewer information, the prompt comprises at least one of a quiz, a questionnaire, a survey, or a feedback form.

In some examples, the interactive overlay content is based on prior viewer information associated with the UID of the media device. In these examples, the method further includes updating, at the data processing hardware of the media device, the viewer information associated with the UID based on the feedback response of the overlaid interactive overlay content.

Optionally, the method further includes overlaying, by the data processing hardware of the media device, a targeted overlay onto the media content. Here, the targeted overlay is based on the viewer information associated with the UID of the media device. In some examples, the method also includes generating, by the data processing hardware of the media device, a report based on the viewer information. In these examples, the report is configured to identify more than one viewer at the media device based on the viewer information associated with the UID of the media device.

In some configurations, determining the media program further includes generating, by the data processing hardware of the media device, the fingerprint based on at least one frame of the media content. Here, the generated fingerprint includes channel information and time codes from the at least one frame. In these configurations, determining the media program also includes identifying, by the data processing hardware of the media device, the media program based on the channel information and the time codes of the generated fingerprint. In some examples, associating the viewer information of the feedback response with the UID of the media device further includes associating the determined media program with the UID of the media device.

Another aspect of the disclosure provides a system for determining viewer data from interactive overlays. The system includes a media device, data processing hardware located at the media device, and memory hardware in communication with the data processing hardware. The memory hardware stores instructions that when executed on the data processing hardware cause the data processing hardware to perform operations. The operations include receiving media content from a content feed. The media device includes a unique identifier (UID). The operations also includes determining a media program associated with the received media content based on a fingerprint of the received media content. The operations further include overlaying interactive overlay content onto the media program of the media content in an overlay area. The overlay area corresponds to a spatial position within at least one frame of the media content. The operations also include receiving a feedback response from a viewer based on the interactive overlay content. The operations further include determining viewer information from the feedback response of the viewer. The operations further include associating the viewer information of the feedback response with the UID of the media device.

In some examples, the interactive overlay content is based on prior viewer information associated with the UID of the media device. In these examples, the operations further include updating the viewer information associated with the UID based on the feedback response of the overlaid interactive overlay content.

Optionally, the operations further include overlaying a targeted overlay onto the media content. Here, the targeted overlay is based on the viewer information associated with the UID of the media device. In some examples, the operations also include generating a report based on the viewer information. In these examples, the report is configured to identify more than one viewer at the media device based on the viewer information associated with the UID of the media device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
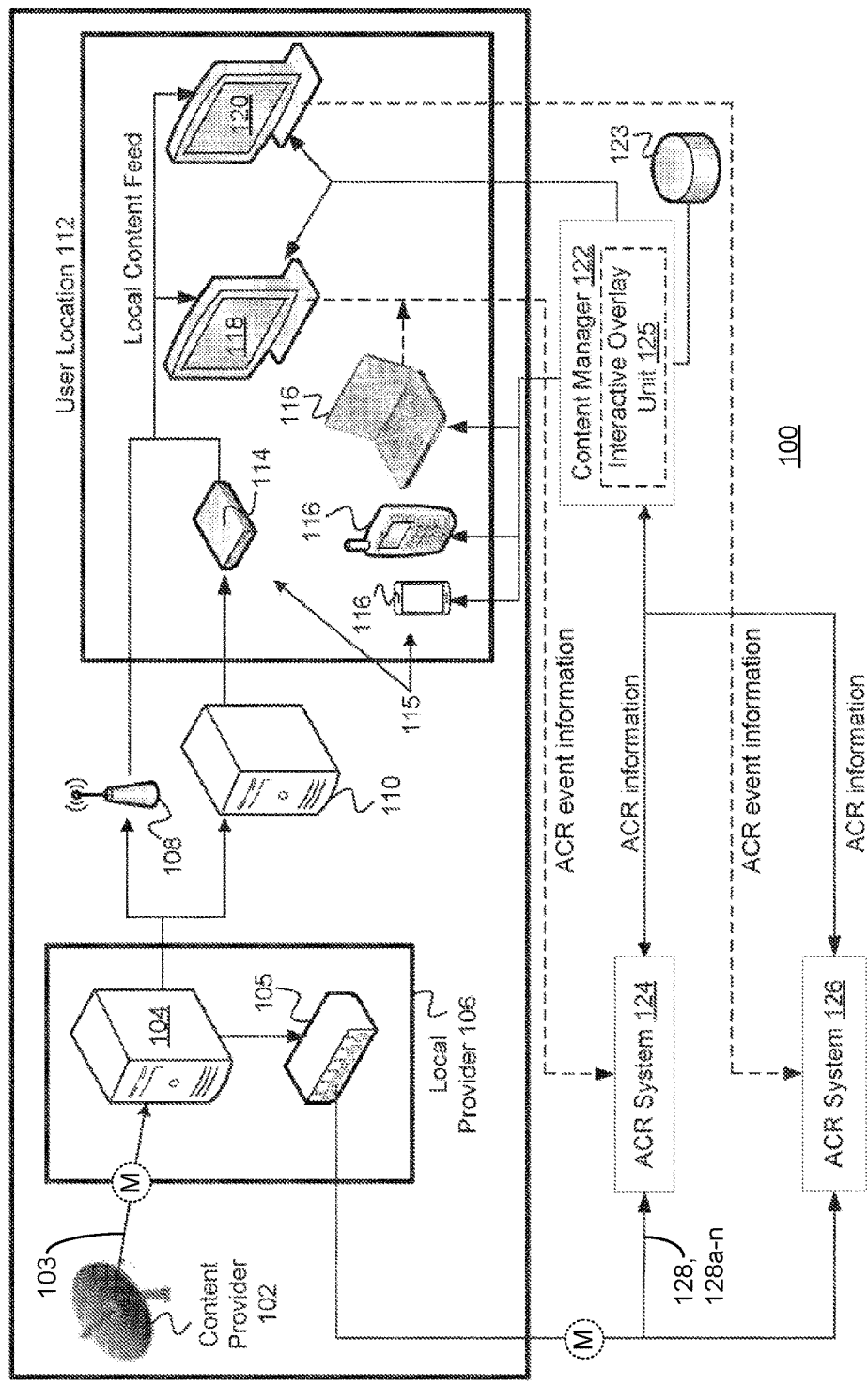
FIG. 1 illustrates a schematic view of an example content distribution network.

Media content broadcasting or streaming are media sources to obtain media content for entertainment, education, news, and other information. Media content broadcasting or streaming, such as television (TV) show broadcasting, can be an engaging venue to advertise products and services or provide information to viewers. Conventionally, media content advertising has been passive advertising. Commercials may be displayed to a viewer during a program at times chosen by the television program producer or distributor. Additionally, conventional content broadcasting or streaming lacks a return path for users to engage with the broadcasted content or the streamed content.

To provide a return path for users to engage the broadcasted content or the streamed content, overlay content may be overlayed or superimposed on media content. In one example, a client device, such as a smart television (TV) or a video consuming device, receives overlay content from an automatic content recognition (ACR) system or a content management system and superimposes the overlay content onto the media content. The overlay content may be inserted at spatial positions or temporal positions within frames or sections of the media content. In one example, an overlay area is selected from multiple predetermined or predefined overlay areas in one or more frames of the media content. In another example, the overlay area is a random location in the media content frames.

The overlay content may be media content that includes: advertisements, news alerts, announcements, or other information in addition to media content of a content feed that is currently being displayed to viewers. To target the overlay content at specific viewers, information about the households is gathered where the media content is displayed to the viewer. Conventionally, the information about the households may be supplied by a third-party vendor that may provide information regarding the residents of the household. Alternatively, the information about the households may be gathered by running quizzes with prizes as an incentive online or over the phone and requiring the entrant to provide information about the household. However, the information from the third party vendor, the online quizzes, and the over the phone quizzes may not be tied back a particular media device or viewer. For example, while the online quizzes and over the phone quizzes provide some useful information about a household, the provided household information may lack specificity regarding the specific viewers in the household and specific media devices used by the viewers.

The present disclosure addresses the above-mentioned and other deficiencies by providing a system to gather viewer information and tie the viewer information to the viewer or a media device. The system may display interactive overlay content to a viewer, receive a response to the interactive overlay content, and associate the response with a unique identifier (UID) for the media device. Associating the response with the UID may enable the system to determine viewer information for a viewer of specific media content.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film."

FIG. 1 illustrates a system diagram of a content distribution network 100 according to one example. In the content distribution network 100, a content provider 102 may broadcast a content feed 103 to a local provider 106. The local provider 106 may include a headend 104 and an automatic content recognition (ACR) fingerprinter server 105. The content feed 103 from the content provider 102 may be received at the headend 104 of the local provider 106.

In various implementations, the headend 104 may generate a local content feed 103 based on the received content feed 103. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed 103 to the ACR fingerprinter server 105, an over-the-air (OTA) broadcaster 108, and/or a multichannel video programming distributor (MVPD) 110. The OTA broadcaster 108 and/or the MVPD 110 may communicate the local content feed 103 to a media device 115. Some examples of the media devices 115 include client devices 118 and 120 (e.g., smart TVs), a set top box 114 that streams provider content to the client devices 118 and 120, as well as other devices 116 (e.g., OTA antenna, satellite dish, and the like) through which the user may stream the local content feed 103.

In one example, the OTA broadcaster 108 may broadcast the local content feed 103 using traditional local television or radio channels. In this example, the client devices 118 and 120 may include antennas (such as TV or radio antennas) and receive the local content feed 103. In another example, the MVPD 110 (such as cable or satellite broadcaster) may communicate the local content feed 103 to a set top box 114. In this example, the set top box 114 may format the content feed 103 for the client devices 118 and 120 and may communicate the formatted content feed 103 to the client devices 118 and 120. The client devices 118 and 120 may include a display device, such as a television screen or a touch screen, to display the local content to a viewer. Various components of the content distribution network 100 may be integrated or coupled to the client devices 118 and 120. For example, a smart television may include the antennas, the set top box 114, and a display device in a single unit.

The ACR fingerprint server 105 may analyze the local content feed 103 and determine fingerprint information (e.g., fingerprints). In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints 128a-n to a cloud-based web service. In some implementations, the ACR fingerprinter server 105 may be installed inside the broadcast facility in order to fingerprint a feed in advance of that feed being delivered to a display device, such as a television (TV).

The ACR fingerprint server 105 may communicate the fingerprints 128a-n to ACR systems 124 and/or 126. The ACR systems 124 and 126 may be different ACR systems selected by device manufacturers, such as smart TV manufacturers.

The ACR fingerprint server 105 may analyze the local content feed 103 and capture fingerprints 128a-n, which may include an ordered sequence of frames from the local content feed 103. The ACR fingerprint server 105 may communicate the fingerprints 128a-n to the ACR systems 124 and/or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In various implementations, the ACR fingerprint server 105 may format fingerprints 128a-n for the different ACR systems 124 and 126, e.g., that include different types of fingerprinting technology such as different fingerprinting algorithms. The ACR systems 124 and 126 may establish communication connections with the different media devices 115, including the client devices 118 and 120, respectively. The client devices 118 and 120 may communicate fingerprint information to the ACR systems 124 and 126, respectively. When the ACR system 124 or 126 receives ACR fingerprint information from the client devices 118 and/or 120, the ACR system 124 or 126 matches the received fingerprints 128a-n with those generated by the ACR fingerprint server 105 and when a match occurs and the content has been identified, may communicate ACR events to a content manager 122. In some implementations, as described below, the content manager 122 includes an interactive overlay unit 125. The interactive overlay unit 125 may identify interactive overlay content stored at the content manager 122 or a memory device coupled to the content manager 122. The content manager 122 may or may not include the interactive overlay unit 125. Details regarding the interactive overlay unit 125 are described below with respect to FIG. 3.

The ACR fingerprint server 105 may analyze the local content feed 103 and capture fingerprints 128a-n, which may include an ordered sequence of frames from the local content feed 103. The ACR fingerprint server 105 may communicate the fingerprints 128a-n to the ACR systems 124 and/or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In various implementations, the ACR fingerprint server 105 may format fingerprints 128a-n for the different ACR systems 124 and 126, e.g., that include different types of fingerprinting technology such as different fingerprinting algorithms. The ACR systems 124 and 126 may establish communication connections with the different media devices 115, including the client devices 118 and 120, respectively. The client devices 118 and 120 may communicate fingerprint information to the ACR systems 124 and 126, respectively. When the ACR system 124 or 126 receives ACR fingerprint information from the client devices 118 and/or 120, the ACR system 124 or 126 matches the received fingerprints 128a-n with those generated by the ACR fingerprint server 105 and when a match occurs and the content has been identified, may communicate ACR events to a content manager 122.

In another example, the ACR systems 124 and 126 receives ACR fingerprint information from the client devices 118 and 120 and matches the received fingerprints 128a-n with those generated by the ACR fingerprint server 105. When a match occurs and the content has been identified, the ACR systems 124 and/or 126 may notify the client device 118 or 120 of the ACR events and then the client device 118 or 120 may communicate those ACR events to a content manager 122. Alternatively, or additionally, the ACR systems 124 and/or 126 directly communicates the ACR events to the content manager 122. The ACR fingerprint information may include: a display of advertisements in the local content feed 103 to a viewer, a display of selected or flagged content in the local content feed 103 to a viewer, a change of content channel at the client device 118 or 120, and so forth.

The event information from the different ACR systems 124 and 126 may be generated in different formats and the content manager 122 may normalize the data into a common format before storing the data into a recorded ACR information database 123 (e.g., database 123 for ease of explanation). For example, the content manager 122 may receive disparate data sets from the ACR systems 124 and 126 that include similar but not identical data, such as data with the same content but formatted differently. The content manager 122 may process and reformat the disparate data sets to create a single data model or format (e.g., reformatted data sets) and the reformatted data sets may be populated into the database 123 in the content manager 122. The event information from the ACR systems, which is stored in the database 123, may further include recorded ACR data from information recorded from users viewing behaviors, interests, and specific viewing history of specific media programs.

In some implementations, to normalize disparate data sets from ACR systems 124 and 126, the content manager 122 may cleanse or filter data in the data sets. For example, some data sets may contain fields or data that may be irrelevant to the content manager 122. In this example, the content manager 122 cleanses or filters the irrelevant data (e.g., the data may be removed or ignored). In another example, some data sets include instances of incomplete or incorrect data or data sets and the content manager 122 cleanses or filters the incomplete or incorrect data or data sets. In another implementations, to normalize the disparate data sets from ACR systems 124 and 126, the content manager 122 maps fields of the data sets. For example, when the content manager 122 receives a first data set from the ACR system 124 and a second data set from the ACR system 126, at least some of the data fields of the first data set and the second data set may be common to both the first and second data set. However, the common data fields may be located at different places in the first and second data sets. In this example, the content manager 122 maps the different data fields of the first and second data sets to normalized fields and have the same data fields in the same data field locations in the database 123.

In another example, to normalize disparate data sets from the ACR systems 124 and 126, the content manager 122 derives data from the data sets. For example, data from the ACR systems 124 and/or 126 may not contain all of the fields that are needed to fill the data fields in the database. However, the content manager 122 may use other fields in the data sets from the ACR systems 124 and 126 to derive data for these data fields.

In some examples, the database 123 includes data fields for such as a state in a country field, a designated market area (DMA), and a county and/or city field but the data sets from the ACR systems 124 and 126 may only include zone improvement plan (ZIP) codes. In this example, the content manager 122 uses the ZIP codes to derive data for the fields in the database. In another example, the data set does not contain any geographic location information, but includes an internet protocol (IP) address of the ACR systems 124 and 126. In this example, the content manager 122 uses a geo-IP lookup service to derive the state, DMA, county, city and ZIP code information.

In another example, the database 123 includes demographic fields such as an age field, a gender field, a household income field, and so forth. However, the data sets from the ACR systems 124 and 126 may not include the demographic fields or demographic data. In this example, the ACR systems 124 and 126 provides the content manager 122 with the IP address of the client devices 118 and 120. The content manager 122 may use the IP addresses to determine the demographic data to populate the data fields in the database.

In another example, a field in a first data set from the ACR system 124 includes local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In some implementations, the content manager 122 uses the normalized data to generate reports or data (viewing data) about user viewing behavior across different ACR technology vendors and smart TV or other Internet-connected video devices. The content manager 122 and the media devices 115 may include communications interfaces to communicate information, such as overlay content 212 and recorded ACR data, between the media devices 115 and the content manager 122.

In some examples, the communication interface communicates the information using a cellular network and/or a wireless network. In one example, the communications network is a cellular network that may be a third generation partnership project (3GPP) release 8, 9, 10, 11, or 12, long term evolution (LTE), or Institute of Electronics and Electrical Engineers (IEEE) 802.16p, 802.16n, 802.16m-2011, 802.16h-2010, 802.16j-2009, 802.16-2009. In another example, the communications network is a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In yet another example, the communications network is a Bluetooth® connection developed by Bluetooth Special Interest Group (SIG) such as Bluetooth v1.0, Bluetooth v2.0, Bluetooth v3.0, or Bluetooth v4.0. In another embodiment, the communications network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In some implementations, the content manager 122 also instructs the media devices 115 to replace portions of the local content feed 103 received from the OTA broadcaster 108 or the MVPD 110 with overlay content 212. Moreover in some examples, the content manager 122 instructs the media devices 115 to overlay or superimpose overlay content 212 onto portions of the local content feed 103. The content manager 122 may aggregate ACR information across multiple ACR systems 124 and 126 and may communicate overlay content 212 to different client devices 118 and 120, where the client devices 118 and 120 may be from different device manufacturers.

The content manager 122 may also establish communication connections with other devices 116 categorized generally as media devices 115. In some examples, the other device 116 communicates with the client devices 118 or 120 and provides an additional screen (e.g., a second screen) to display overlay content 212. For example, the client devices 118 and 120 receives the local content feed 103 from the OTA broadcaster 108 or the MVPD 110 and displays the local content feed 103 to the user. The other devices 116 may also communicate ACR event information to the ACR systems 124 and 126 when an ACR event occurs, as discussed in the preceding paragraphs. When the content manager 122 receives the ACR event information, the content manager 122 may communicate overlay content 212 to the other devices 116.

In some implementations, the client devices 118 and 120 continue to display the local content feed 103 while the other devices 116 display the overlay content 212. In another example, the client devices 118 and 120 and the other devices 116 both display the overlay content 212. In yet another example, the client devices 118 and 120 and the other devices 116 display a portion of the overlay content 212 and a portion of the local content feed 103. The client devices 118 and 120 and the other devices 116 may display different local content feed 103s and/or overlay content 212.

The client devices 118 and 120 and/or the other devices 116 may display the overlay content 212 at the time the overlay content 212 is received. In some examples, the client devices 118 and 120 and/or the other devices 116 delay displaying the overlay content 212 for a threshold period of time. The threshold period of time may be a predefined period of time or the content manager 122 may select a period of time for the client devices 118 and 120 and/or the other devices 116 to delay displaying the overlay content 212.

Figure 2:
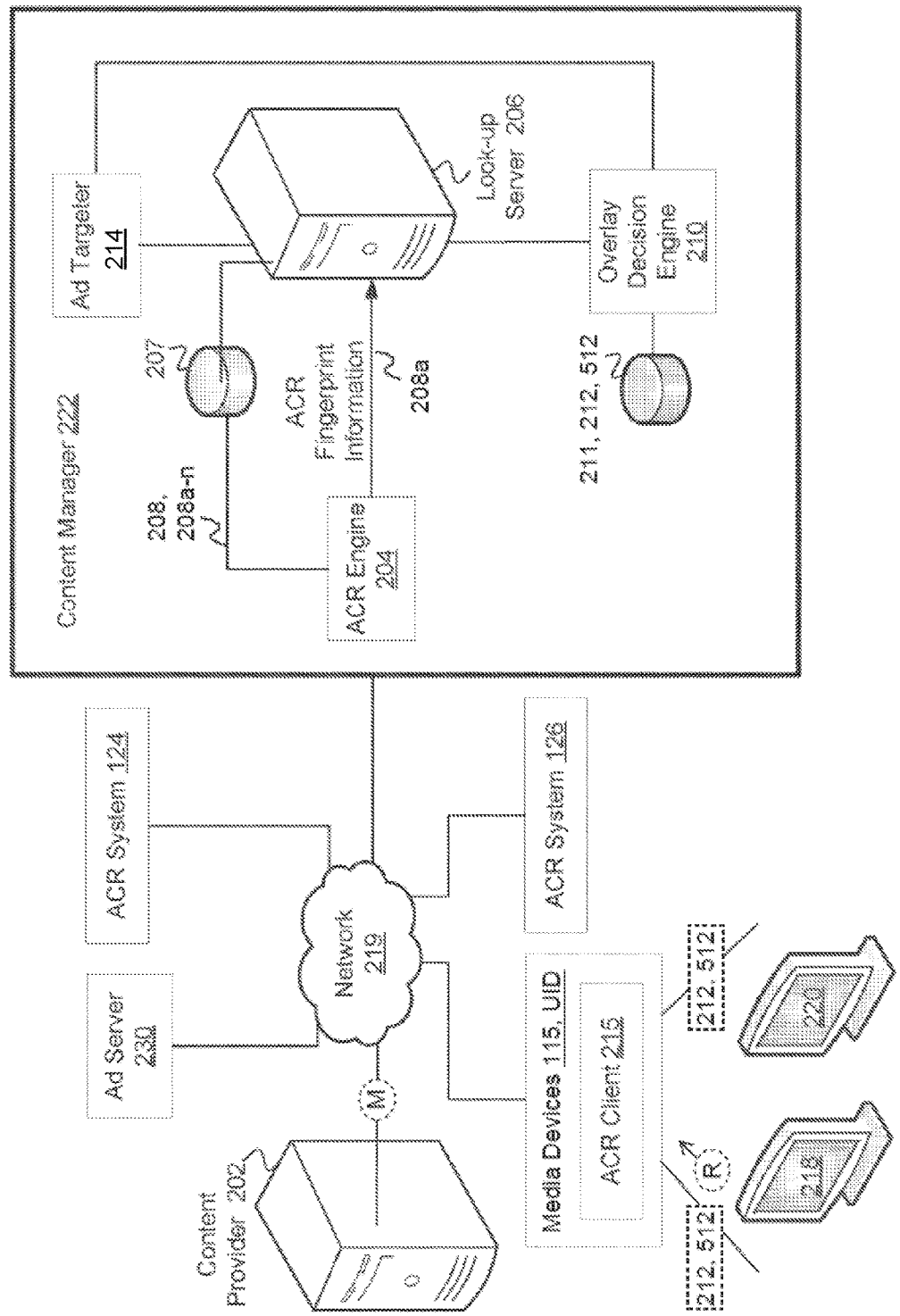
FIG. 2 illustrates a schematic view of an example content manager to provide overlay content to a media device such as to client devices.

FIG. 2 illustrates system 200 that includes a content manager 222 to provide overlay content to a media device 115 such as to client devices 218 and/or 220. A content provider 202 (e.g., a television broadcaster) may stream media content M to the media device 115 over a network 219, which streaming may be intercepted by the content manager 222 before or simultaneously with the streaming of the media content M to the media device 115. The content manager 222 may also communicate with an advertisement server (or "ad" server) 230 such as to send the ad server 230 an advertising call that requests an advertisement be served with (or as an overlay to) the media content M to target the subject matter of the media content M and/or interests of a user as will explained in more detail. The ad server 230 may be a third party or external server that provides advertising or other overlay content 212 to the content manager 222 for later delivery to the media devices 115 or may provide the content directly to the media devices 115 for delivery as overlay 212 or replacement advertisements.

The content manager 222 may include an ACR engine 204, a look-up server 206, an overlay decision engine 210, an overlay database 211 in which to store overlay content 212, and an ad targeter 214. The content provider 202 may upload media content M to the ACR engine 204 over the network 219.

The ACR engine 204 may fingerprint the media content M. In some examples, the ACR engine 204 generates fingerprints 208a-n by fingerprinting every frame of a feed, every other frame of the feed, a sequence of frames and so forth. For example, the ACR engine 204 generates a fingerprint 208 for a frame of the feed by performing a discrete cosine transform (DCT) of the frame and designating a subset of the resulting coefficients (e.g., the low-frequency coefficients) as the fingerprint 208. Additionally, or alternatively, the ACR engine 204 may generate (or identify) a target block of fingerprints 208a-n that correspond to an ordered sequence of frames of content being streamed to a media device 115. Furthermore, the look-up server 206 may find a matching source block of frame fingerprints 208a-n stored in a fingerprint database 207 for the originating media programs (e.g., originating content) for which an identity is known.

In another or related implementation, the ACR engine 204 also analyzes ACR event information to determine what event may have occurred, e.g., a positive match between a sequence-of-frames query fingerprint 208a and frame fingerprints 208a-n of originating content stored in the ACR system 124 or 126. When there is a positive match, the ACR engine 204 sends a positive match indicator to the requesting media device 115 that includes a media content identifier (ID) that identifies the content for which a positive match results. The media device 115 may send an overlay request to the overlay decision engine 210 requesting a media content overlay 212. In some examples, the overlay request includes the media content ID. In other examples, the overlay request includes overlay information or overlay parameters.

With further reference to FIG. 2, the ACR engine 204 may communicate fingerprints 208a-n to the look-up server 206, which may look up and determine a television program (e.g., scheduled for an identified channel) and location within the television program corresponding to an ACR event received from the ACR system 124 or 126. Each fingerprint 208 of a segment of the feed may be associated with a time stamp. The time stamp belongs to individual frames of the segment of the feed when received by the ACR engine 204. The time stamp may be a frame number within the feed from an arbitrary starting point. The look-up server 206 stores the fingerprints 208a-n in association with their respective time stamps (e.g., in the fingerprint database 207), and aids the ad targeter 214 and the overlay decision engine 210 in timing and content targeting within the media content M of the feed that the user is viewing.

In some implementations, the ACR engine 204 interacts with an ACR client 215 at various media devices 115. The ACR client 215 may locally match fingerprints 208a-n and confirm whether or not the user has changed a channel to watch a different television program, and to report the channel change to the content manager 222. Accordingly, matching of fingerprints 208a-n may occur locally at the media devices 115 in some cases.

Furthermore, the ACR client 215 may periodically, continuously, or semi-continuously communicate user fingerprint information to the look-up server 206, e.g., in the form of query fingerprints 208a, including target blocks, requesting to confirm the television program or channel being watched on the media device 115. The look-up server 206 may determine when there is a match between the query fingerprint(s) 208a (or target blocks) and a multitude of frame fingerprints 208a-n, which may be stored as source blocks of fingerprints 208a-n in the fingerprints database 207 or across the network 219 from the look-up server. The query fingerprint 208a may be an ordered sequence of frames, respective ones of which may be matched with individual ones of the frame fingerprints 208a-n until finding a sufficient match to be associated with the television program or channel streamed the television program. When there is a positive match, the look-up server 206 communicates a positive match indicator to the ACR client 215. In response to the positive match indicator, the ACR client 215 sends an overlay 212 request to an overlay decision engine 210 requesting a media content overlay 212.

In some examples, the overlay request includes a media content identifier (ID). In additional examples, the overlay request includes overlay information or overlay parameters. For example, the overlay decision engine 210 uses the content ID, overlay information, and/or overlay parameters to identify targeted overlay content 212. In another example, the overlay decision engine 210 may use the content ID, overlay information, and/or overlay parameters to identify an overlay format. The overlay decision engine 210 may compare the content ID, overlay information, and/or overlay parameters with an overlay database 211 to identify the targeted overlay content 212 and the overlay format. The overlay database may be updated, by a content provider or an advertiser (e.g., the ad server 230), with new overlay content 212 and overlay formats on a periodic or continuous basis. The overlay content 212 populates the overlay format (such as an overlay template or the like) before or after being delivered to an overlay position of the streamed media content M of the television program of channel.

The ad targeter 214 tracks and analyzes user interaction with and behavior regarding advertisements and other overlay content 212 delivered to the media devices 115 by the overlay decision engine. The ad targeter 214 may also receive and incorporate user profile information with the analysis of user behavior on a per-media-device basis, to determine subject matter of interest to users. This information and data gathered on a user or group of users may extend to preferred viewing times and typical viewing habits with regards to television programs and the channels typically watched, and when. The ad targeter 214 may then inform the overlay decision engine 210, e.g., in the form of parameters, different subject matters of interest and viewing habits that the overlay decision engine 210 may use in deciding what overlay content 212 to select for delivery to respective users, how to format it and when best to deliver for maximum return on investment of campaign budgets.

When the overlay decision engine 210 identifies the targeted overlay content 212 with the help of the ad targeter 214, the overlay decision engine returns targeted overlay content 212 to the media device 115. In some examples, the overlay decision engine 210 communicates the targeted overlay content 212 directly to the media device 115, such as via a wireless communications network. In other examples, the overlay decision engine 210 communicates the targeted overlay content 212 to the media device 115 via a universal resource locator (URL). When multiple targeted overlay contents 212 match the content ID, overlay information, and/or overlay parameters, the overlay decision engine 210 selects the targeted content overlay that meets a greatest number parameters or other information. Additionally or alternatively, when multiple targeted overlay contents 212 match the content ID, overlay information, and other overlay parameters, the overlay decision engine 210 randomly selects an overlay content 212 that meets the parameters and other information. In further examples, when multiple targeted overlay contents 212 match the content ID, overlay information, and overlay parameters, the overlay decision engine 210 selects predetermined overlay content 212 that matches the content ID, overlay information, and/or overlay parameters. The overlay content 212 may be populated with dynamic content (e.g., content that may be updated or refreshed at periodic intervals). The dynamic content may be stored in a local database or an external system.

The ACR client 215 of the media device 115 may superimpose overlay content 212 over the content feed 103 when the ACR fingerprint information matches the user fingerprint information. In one example, the media device 115 superimposes overlay content 212 over the content feed 103 in a hypertext markup language (HTML) browser. In another example, the media device 115 superimposes overlay content 212 over a content feed 103 from an OTA broadcaster or a cable broadcaster. When the overlay content 212 is placed over the content feed 103, the overlay content 212 may be displayed to the user via a display of the media device 115. In one example, the overlay content 212 includes one or more call-to-action options that may be displayed to a user. In this example, the user interacts with the overlay content 212 using an input device (such as a TV remote, keyboard, a smartphone, or a tablet) to create feedback information. The ACR client 215 may communicate the feedback information to the ad targeter 214. Another individual, such as an advertiser, may access the feedback information and analyze the feedback information to determine desired information, such as user interest in the overlay content 212.

The ACR client 215 may monitor the content feed 103 to determine when the overlay content 212 and content feed 103 match ceases and/or a threshold period of time expires. In one example, when the overlay content 212 and content feed 103 match ceases or a threshold period of time expires, the media device ceases to superimpose the overlay content 212 for display on the media device 115.

Figure 3:
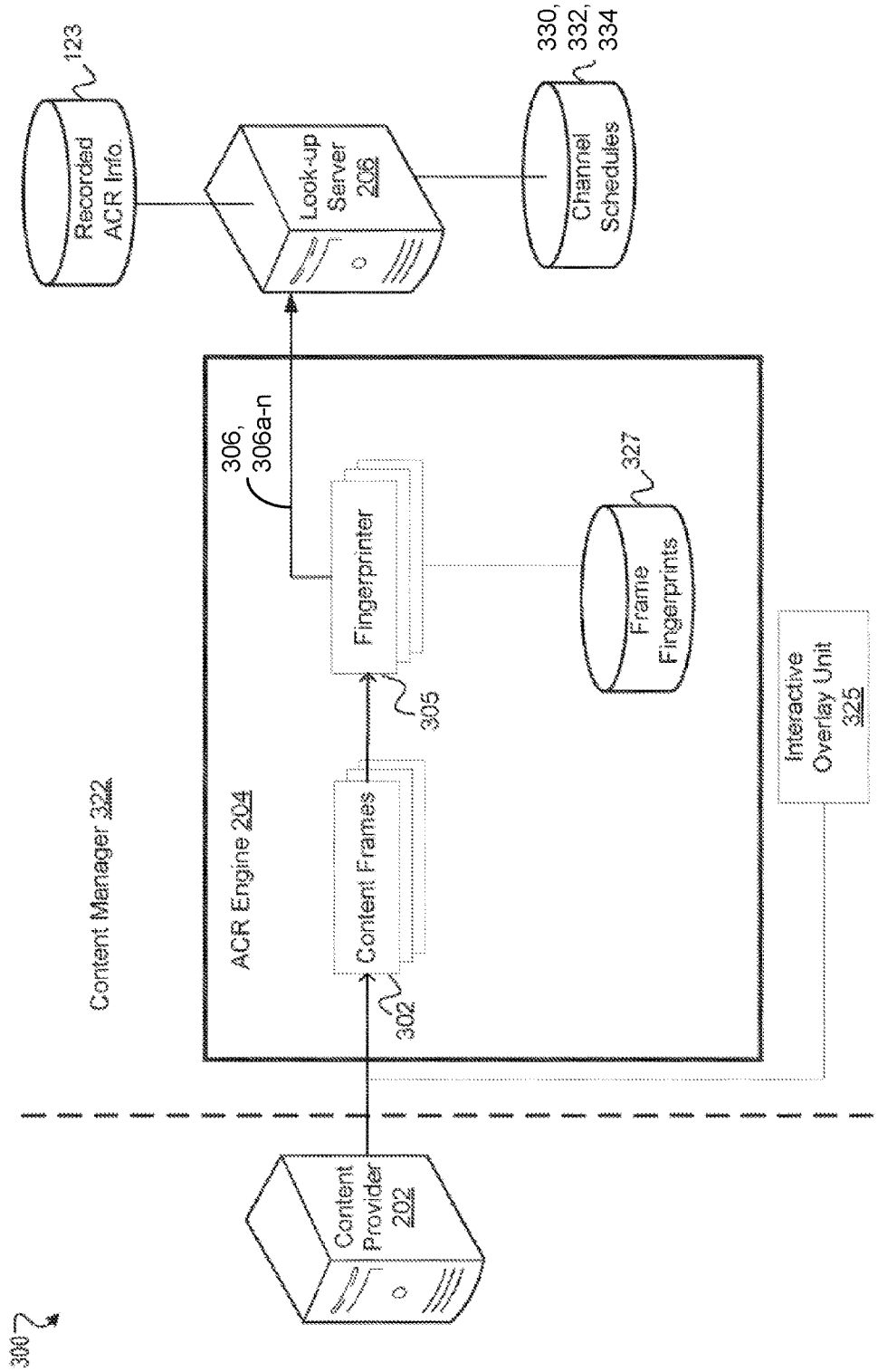
FIG. 3 is a schematic view of an example content manager used to identify interactive overlay content to display on a media device.

FIG. 3 is a system 300 that includes a content manager 322, such as content manager 122 and 222 illustrated in FIGS. 1-2, used to identify interactive overlay content to display on a media device. The content manager 322 may include the ACR engine 204, the look-up server 206, the recorded ACR information database 123, and a channel schedules database 330. The ACR engine 204 may receive content frames 302 of the media content to be fingerprinted, a fingerprinter 305, an interactive overlay unit 325, and a database 327 in which are stored frame fingerprints, according to one embodiment. The content provider 202 may generate multimedia content that is streamed to the media devices 115, including the client devices 218 and/or 220 (FIG. 2).

The content manager 322 may be implemented with a computing device, such as server, or a distributed group of computing devices, to include the look-up server 206. In an alternative implementations, the content manager 322 and the look-up server 206 are combined into a single server device.

In some implementations, the fingerprinter 305 detects or selects a number of content frames 302 from the multimedia content M as a fingerprint 306. In one embodiment, the number of content frames 302 is sequentially ordered (e.g., as a target block), and thus includes sequential time stamps from a beginning to an end of the fingerprint 306. In one example, the content is audio data, video data, or both. In this example, video content is raw video frames.

For example, when the fingerprinter 305 receives the content frames 302, the fingerprinter 305 determines how to process the content frames 302, such as the raw video and/or audio frames to generate the fingerprint 306. In one example, the frames are fingerprinted individually. In another example, the frames are fingerprinted in collections or sequences. The fingerprinter 305 may determine when to fingerprint the frames individually or sequentially based on an ACR algorithm that the fingerprinter 305 executes during fingerprinting, examples of which will be discussed. Additionally, the fingerprinter 305 may fingerprint the content frames 302 differently for different broadcasters or users. In this example, the fingerprinter 305 includes different ACR fingerprinting algorithms for different ACR vendors. In one example, the different ACR fingerprinting algorithms are predetermined and stored in memory of the ACR engine 204.

In yet another example, the different ACR fingerprinting algorithms are provided by third party ACR vendors. When the different ACR fingerprinting algorithms are provided by such vendors, the fingerprinter 305 aggregates the different ACR fingerprinting algorithms. In one example, ACR fingerprinting uses raw video within the YUV 4:2:2 colorspace and at high resolutions or other levels of resolution. When video content is received at the local provider 106 or other content provider 202, the fingerprinter 305 converts the video content to YUV 4:2:0 colorspace and scale it down in resolution to a threshold resolution level for encoding by a broadcaster or distributor before being sent to the media devices 115.

The interactive overlay unit 325 may identify interactive overlay content to send to a client device 218 or 220. When the fingerprinter 305 has fingerprinted the content frames 302, the fingerprinter 305 sends fingerprints 306a-n (including channel information, time codes, and fingerprint information) to the overlay database 211 and/or to the look-up server 206. The look-up server 206 retrieves the fingerprints 306a-n and related information from the overlay database 211. The look-up server 206 may also be in communication or coupled with the overlay decision engine 210 and the ad targeter 214, to send overlay 212 and subject matter matching information to the overlay decision engine 210 and the ad targeter 214 with which to contextually target users on the client device 218 or 220.

In some examples, the different ACR fingerprinting algorithms are used on the same content to provide different fingerprint information to look-up servers of different ACR vendors. An advantage of fingerprinting the same content (e.g., content frames) 302 differently may be to provide contextually-relevant advertisements and interactive content to different viewers of media consumption devices. In additional examples, the content frames 302 include media content M from different feeds. In this example, the different ACR fingerprinting algorithms are used on the content of the different feeds of the content frames 302 to provide different fingerprinting information to the look-up servers of different ACR vendors.

The different fingerprinting information may be uploaded to the look-up servers of the different ACR vendors, respectively. Different ACR vendors may be integrated on viewing devices manufactured by different contract equipment manufacturers (CEMs). For example, Toshiba televisions may utilize Samba® ACR fingerprinting and Samsung® televisions may use Enswer® ACR fingerprinting. An advantage of the fingerprinter 305 including ACR fingerprinting algorithms for different ACR vendors, may be to fingerprint content provided to viewers via different ACR vendors regardless of the manufacturer of the media consumption device. In one example, the ACR fingerprinting information are used for digital advertisement replacement (DAR). In another example, the ACR fingerprinting information are used for advertisement or content augmentation and data collection. The overlay decision engine 210 and the ad targeter 214 (FIG. 2) may use the fingerprinting information to match the encoded content with contextually-relevant advertisements, informational and/or interactive content. The matched content and/or advertisements may then be provided to the media devices 115 for streaming display thereon. In yet another example, information about matching events are communicated to a broadcast cloud for analysis of content matching.

The fingerprinter 305 may perform ACR fingerprinting upstream of broadcast distribution in the system. For example, the fingerprinting occurs in the broadcast chain where broadcast feeds may be delivered for encoding/uploading. When a single broadcast feed is used, a number of devices and/or applications that need to be purchased, installed, monitored, and maintained for ACR fingerprinting and encoding/uploading may be reduced. For example, capital expenses (CAPEX) and/or operational expenses (OPEX) may be reduced, such as a reduced system infrastructure (rack space, power, and Ethernet connectivity). Additionally, when a single broadcast feed is used, a number of broadcast feeds generated from a broadcaster's distribution amplifier may be reduced.

As discussed, the fingerprinter 305 may generate individual fingerprints 306a-n from multimedia content M, such as may pass through a broadcasting server, a headend, a switch, and/or a set-top box, in route to being displayed on one of the media devices 115. The fingerprints 306a-n may include one frame or a number of frames. The frames may be taken in a sequential order with chronological time stamps, or may be taken at some interval such as every other (or every third frame), for example, still with corresponding time stamps.

In some implementations, the content manager 322 coordinates with the overlay decision engine 210 and the overlay database 211 (FIG. 2) for delivery of the overlay 212 that targets an interaction with the look-up server 206 and access to the recorded ACR information database 123. The restart of the streaming (e.g., from paused, terminated, rewound, or fast forwarded) may be to begin playing a Hypertext Transfer Protocol (HTTP) live streaming (HLS) stream from the television broadcaster, or from a buffered version of the remainder of the media program stored at the content manager 322.

Figure 4:
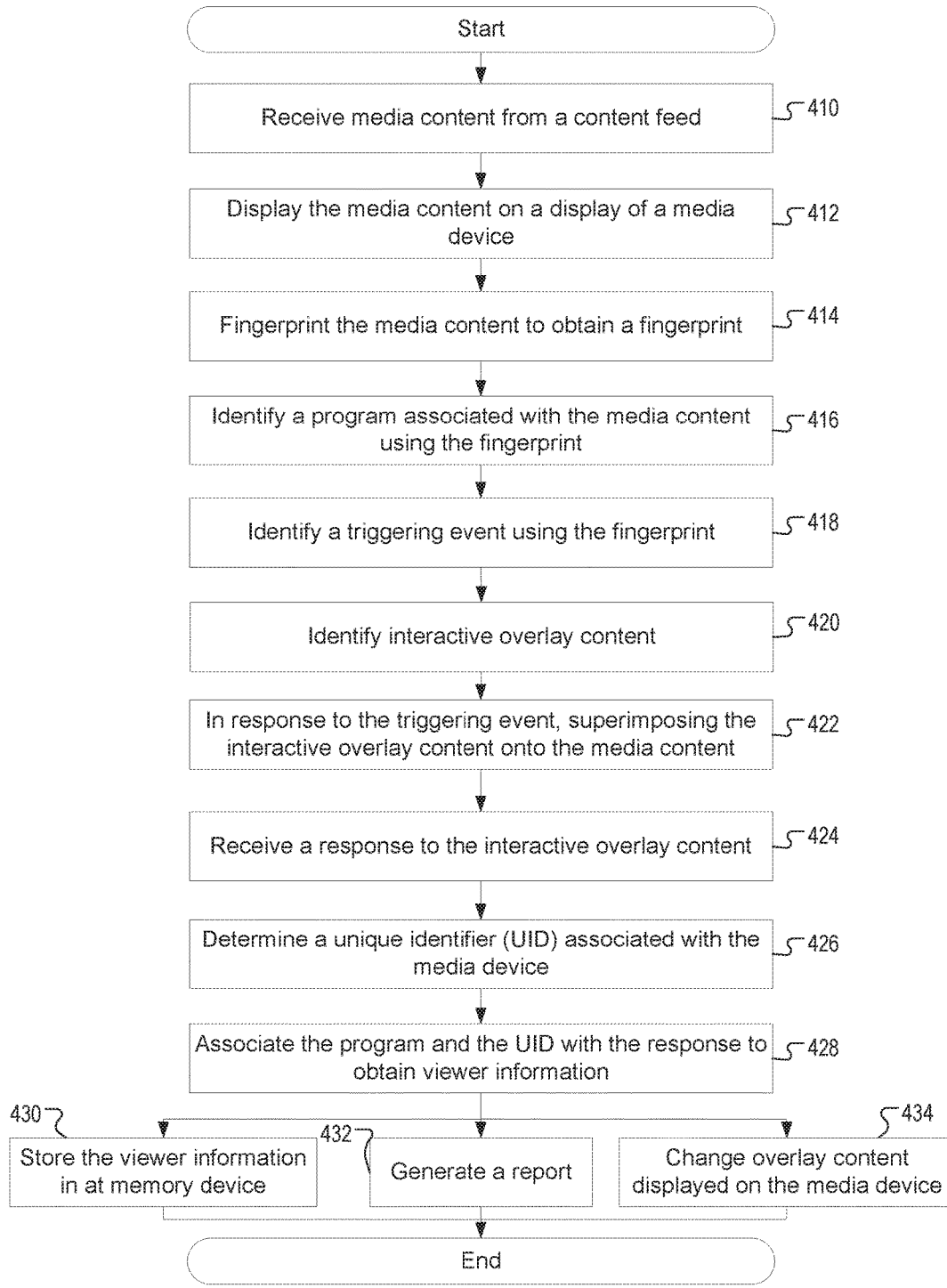
FIG. 4 illustrates a schematic view of an example method for associating media content with a UID of a media device and a response to interactive overlay content.

FIG. 4 illustrates an example method 400 for associating media content with a UID of a media device and a response R to interactive overlay content. The method 400 may at least partially be performed by processing logic that includes hardware (e.g., circuitry, dedicated logic, a processing component, microcode, etc.), software (e.g., instructions executed by a processing device), firmware or a combination thereof. In some implementations, the method 400 is performed by all or part of the content distribution network 100 of FIG. 1, the system 200 of FIG. 2, or the system 300 of FIG. 3. For example, the method 400 is performed by the ACR system 124 or 126, the content manager 122, or the media devices 115.

Referring to FIG. 4, the method 400 begins at block 410 with a media device receiving media content from a content feed. At block 412, the method includes the media device displaying the media content on the media device. At block 414, the method includes an ACR system fingerprinting the media content. At block 416, the method includes the ACR system identifying a program associated with the media content using the fingerprint. At block 418, the method includes identifying a triggering event using the fingerprint. In some implementations, the triggering event is the media device displaying the media content. In other implementations, the triggering event is the media device pausing the displaying of the media content.

At block 420, the method includes an interactive overlay unit identifying interactive overlay content to superimpose onto the media content. In some examples, the interactive overlay unit uses the fingerprint to identify interactive overlay content that is associated with the media content. In other examples, the interactive overlay unit randomly selects interactive overlay content. In some implementations, the interactive overlay unit selects the same interactive overlay content to be superimposed onto media content displayed on multiple media devices. The interactive overlay unit may send the interactive overlay content to the media device.

At block 422, the media device, in response to the triggering event, superimposes an interactive overlay content onto the media content. The interactive overlay content may be a prompt that is displayed to a viewer to gather information about the viewer. For example, the interactive overlay content is a quiz, a questionnaire, a survey, or a feedback form to gather information about the viewer or the household of the viewer. The interactive overlay content may be used to gather information that includes an age of the viewer, a gender of the viewer, a number of people living in the household, a number of people under the age of 18 in the household, an annual income of the viewer or household, and so forth.

At block 424, the method includes the media device receiving a response R to the interactive overlay content. At block 426, the method includes the media device determining a UID associated with the media device. At block 428, the method includes the media device associating the program and the UID with the response R to obtain a viewer information data. In some implementations, the media device sends an identifier identifying the program, the UID, and the response R to the interactive overlay content to an ACR system. The ACR system may associate the program and the UID with the response R to obtain viewer information.

At block 430, the method includes the media device storing the viewer information in a memory device. At block 432, the method includes generating a report using the viewer information. In some implementations, the report indicates information about a viewer of the program. For example, the report indicates demographic information of the viewer. In some implementations, the report indicates information about a household where the program is watched. As an example, the report indicates that the household includes both male and female residents. In another example, the report indicates that 80 percent of the viewers in the household who have responded to the interactive overlay content during a program were male. In yet another example, the report indicates that there is a 75 percent chance at least one female is watching a program. In some implementations, the report is aggregated with other information. The other information may be previous viewer information stored at the memory device. In some examples, the other information is information from a third party vendor.

In some implementations, the report indicates specific information about a viewer of the media content. For example, the report indicates a particular person in a household previously viewed or is currently viewing a particular broadcast program. In this example, the report avoids a general report about the entire household (such as a report indicating a household with a 19 year old male and a 54 year old male viewed the broadcast program) and provides a specific report with detailed information (such as a household with a 19 year old male and a 54 year old male has watched this program and the 19 year old definitely watched the program). The detailed information of the specific report may be determined using the information received when the viewer interacts with the interactive overlay content. In some examples, the detailed information is also generalized to avoid an intrusion into the viewer's privacy. In some implementations, the detailed information from other viewers is aggregated together to provide a generalized report to avoid an intrusion into the viewers' privacy. For example, detailed information about 19-24-year-old males and 49-54-year-old males is aggregated to provide a report indicating that of households including 19-24 year olds and 49-54 year olds, the viewers in the 19-24 year old group were definitely watching the broadcast program 80% of the time. In some examples, the report indicates the viewing habits of a viewer. For example, the report aggregates multiple responses R from the same viewer to indicate the viewing habit of the viewer of a period of time.

In some implementations, when the media device displays media content for multiple broadcast programs, the media device or ACR system assumes that the same viewer that interacted with the interactive overlay content in a first broadcast program is also viewing a second broadcast program when the media devices consecutively displays the first and second broadcast programs. In some implementations, the report indicates a viewer's attentiveness in watching the broadcast program based on whether the viewer responds to the interactive content overlay. For example, when the viewer does not respond to the interactive content overlay, the report indicates the viewer was not as attentive to the broadcast program. When the viewer responds to the interactive content overlay, the report may indicate the viewer was attentive.

Demographic metrics have been used as a basis for targeting entertainment, advertising, and promotional material to an audience group. Demographic metrics have also been used by motion picture producers and distributors to obtain raw feedback data on overall audience appeal and on the relative degree of commercial success or failure of a motion picture. Thus far, however, demographic audience data has not been employed for adapting motion picture content to a particular audience, nor has other commercially available demographic data been used for attracting an audience for a feature presentation at particular viewing locations.

At block 434, the method includes an ACR system, a content manager, or the media device changing content that is displayed on the media device in view of the viewer information data. For example, when the media device determines that the viewer is a female, the media device switches from displaying subsequent overlay content designated for a male viewer to overlay content designated for a female viewer. The ACR system, the content manager, or the media device may change the subsequent overlay content while the program is being viewed by the viewer. For example, when the media device determines the viewer is a female viewer, the media device can switch one or more overlay content designated to be displayed during the program from overlay content designated for a male viewer to overlay content designated for a female viewer.

The ACR system, the content manager, or the media device may generate the report and send the report to a client device in real-time as the response R is received or shortly after the response R is received. A content provider may view the report and be able to determine viewership information for the program as the program is being viewed.

In some implementations, the storing of the viewer information, the generating of the report, and/or the changing of the overly content is performed in parallel or at least partially concurrently. In other implementations, the storing of the viewer information, the generating of the report, and/or the changing of the overly content is performed consecutively or sequentially.

Figure 5:
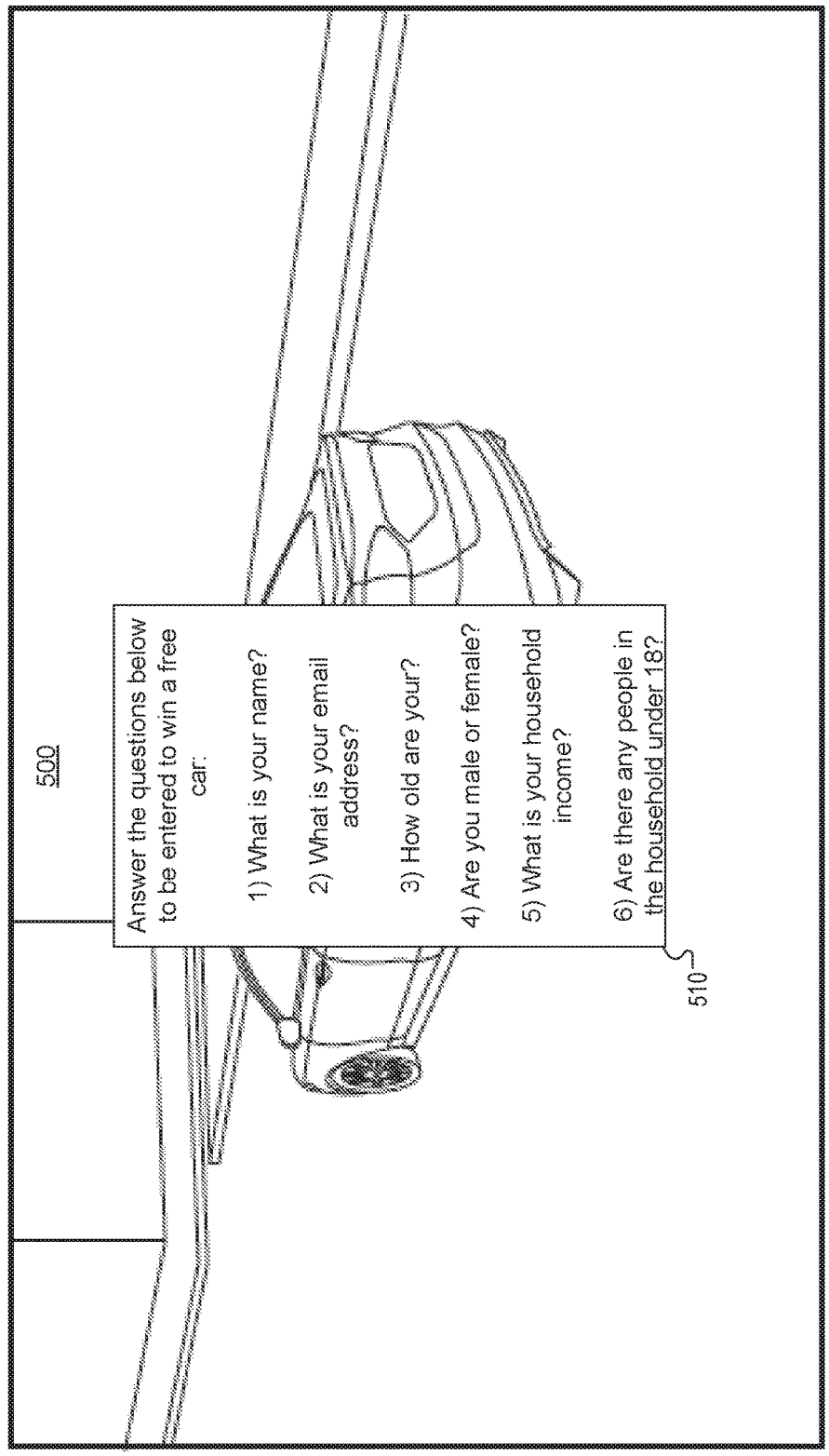
FIG. 5 illustrates a schematic view of an example of media content that includes interactive overlay content.

FIG. 5 illustrates an example of media content 510 that includes interactive overlay content 512. At least a portion of the interactive overlay content 512 may be a quiz, a questionnaire, a survey, a feedback form, and so forth. In one example, the interactive overlay content 512 is displayed on a smart TV. A viewer may respond to the interactive overlay content 512 using a device coupled to the smart TV. The device coupled to the smart TV may include a TV remote control, a keyboard, a mouse, a touchpad, a touch screen that is integrated into the smart TV, a smartphone, and so forth. In another example, the interactive overlay content 512 is displayed on the device coupled to the media device. For example, the media device is a smart TV and a smartphone may be coupled to the smart TV. When the smart TV receives the overlay content, the smart TV sends the overlay content to the smartphone to display. The viewer may respond to the overlay content via the smartphone and the smartphone may send the response R to the smart TV.

Figure 6:
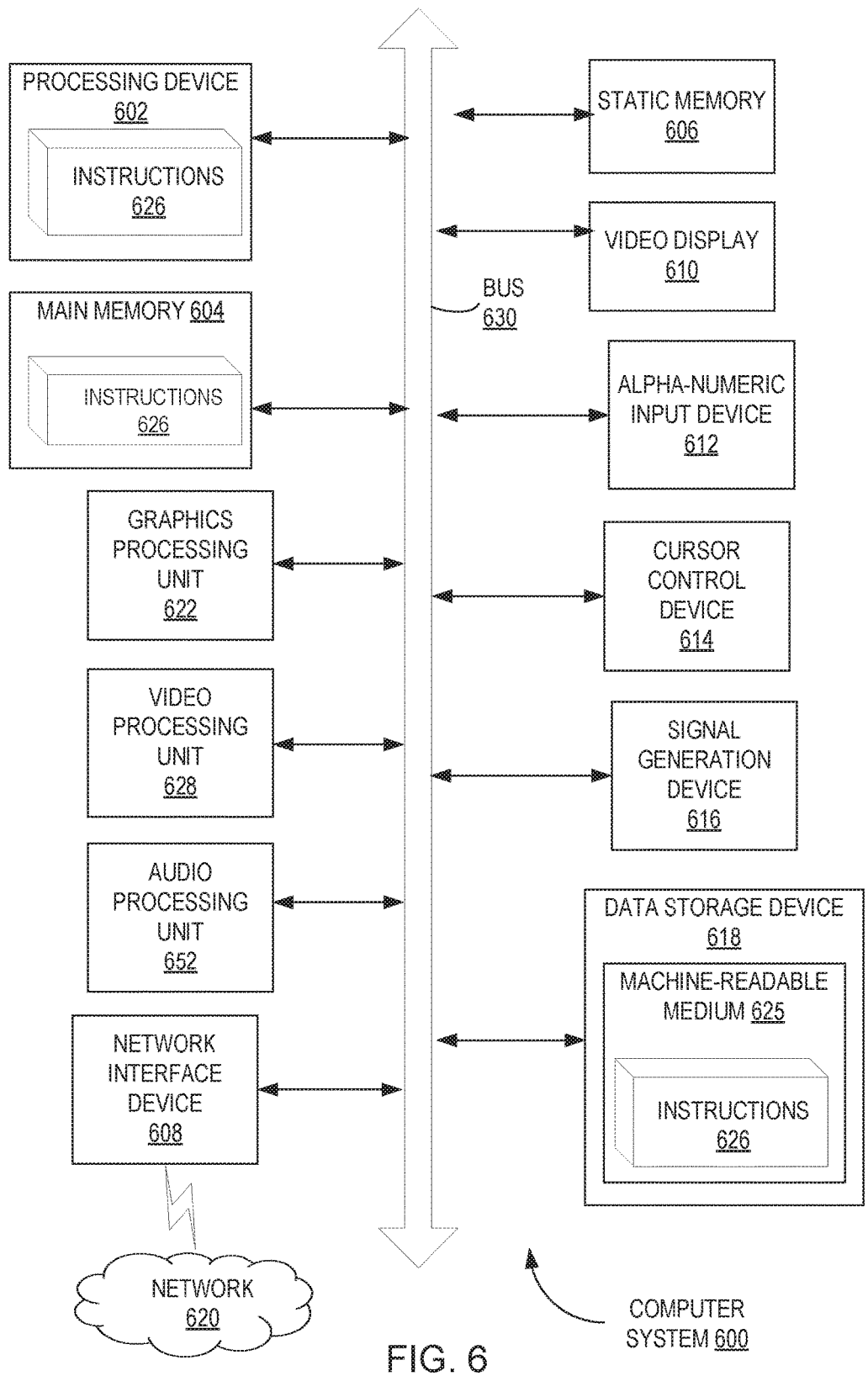
FIG. 6 illustrates a diagrammatic representation of an example machine in the form of a computer system within which a set of instructions, for causing the machine to perform any one or more of the methodologies discussed herein.

FIG. 6 illustrates an example diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 may correspond to the ACR system 124 or 126 of FIG. 1, to the ACR system 224 or 226 of FIGS. 2 and 3, or to the content manager 122 of FIG. 1, the content manager 222 of FIG. 2, or the content manager 322 of FIG. 3. The computer system 600 may correspond to any media device 115 such as the client device 118 or 120 of FIG. 1. The computer system 600 may correspond to at least a portion of a cloud-based computer system.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In some implementations, processing device 602 may include one or more processing cores. The processing device 602 may execute the instructions 626 of a mirroring logic for performing the operations discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a signal generation device 616 (e.g., a speaker), or other peripheral devices. Furthermore, computer system 600 may include a graphics processing unit 622, a video processing unit 628, and an audio processing unit 632. In another embodiment, the computer system 600 may include a chipset (not illustrated), which refers to a group of integrated circuits, or chips, that are designed to work with the processing device 602 and controls communications between the processing device 602 and external devices. For example, the chipset may be a set of chips on a motherboard that links the processing device 602 to very high-speed devices, such as main memory 604 and graphic controllers, as well as linking the processing device 602 to lower-speed peripheral buses of peripherals, such as USB, PCI or ISA buses.

The data storage device 618 may include a computer-readable storage medium 625 on which is stored instructions 626 embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting computer-readable storage media.

The computer-readable storage medium 625 may also be used to store instructions 626 utilizing logic and/or a software library containing methods that call the above applications. While the computer-readable storage medium 625 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 626 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further implementations.

While the present disclosure has been described with respect to a limited number of implementations, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The implementations are described with reference to secure memory repartitioning in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the present disclosure may be applied to other types of circuits or semiconductor devices that may benefit from higher pipeline throughput and improved performance. The teachings of implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the present disclosure rather than to provide an exhaustive list of all possible implementations of implementations of the present disclosure.

Although the below examples describe instruction handling and distribution in the context of execution units and logic circuits, other implementations of the present disclosure may be accomplished by way of a data or instructions stored on a machine-readable, tangible medium, which when performed by a machine cause the machine to perform functions consistent with at least some implementations of the disclosure. In some implementations, functions associated with implementations of the present disclosure are embodied in machine-executable instructions. The instructions may be used to cause a general-purpose or special-purpose processor that is programmed with the instructions to perform the steps of the present disclosure. Implementations of the present disclosure may be provided as a computer program product or software which may include a machine or computer-readable medium having stored thereon instructions which may be used to program a computer (or other electronic devices) to perform one or more operations according to implementations of the present disclosure. Alternatively, operations of implementations of the present disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in some implementations, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In some implementations, use of the term logic includes hardware, such as transistors, registers, or other hardware, such as programmable logic devices.

Use of the phrase 'configured to,' in some implementations, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in some implementations, refers to some apparatus, logic, hardware, and/or element designed in such a way to enable use of the apparatus, logic, hardware, and/or element in a specified manner. Note as above that use of to, capable to, or operable to, in some implementations, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In some implementations, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in some implementations, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "some implementations" or "an embodiment" means that a particular feature, structure, or characteristic described in connection with the embodiment is included in at least some implementations of the present disclosure. Thus, the appearances of the phrases "in some implementations" or "in an embodiment" in various places throughout this specification are not necessarily all referring to the same embodiment. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct implementations, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "some implementations" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
    receiving, at data processing hardware of a media device, media content from a content feed, the media device comprising a unique identifier (UID);
    determining, by the data processing hardware of the media device, a media program associated with the received media content based on a fingerprint of the received media content; and
    while the media program is being displayed by the media device:
        overlaying, by the data processing hardware of the media device, interactive overlay content onto the media program of the media content in an overlay area, the overlay area corresponding to a spatial position within at least one frame of the media content;
        overlaying, by the data processing hardware of the media device, first overlay content onto the media program of the media content, wherein the first overlay content is associated with a first viewer characteristic;
        receiving, at the data processing hardware of the media device, a feedback response from a viewer based on the interactive overlay content;
        determining, by the data processing hardware of the media device, viewer information from the feedback response of the viewer;
        associating, by the data processing hardware of the media device, the viewer information of the feedback response with the UID of the media device;
        determining, by the data processing hardware of the media device, that the viewer information associated with the UID of the media device indicates a second viewer characteristic that is different from the first viewer characteristic; and
        in response to determining that the viewer information indicates the second viewer characteristic that is different from the first viewer characteristic, dynamically switching, by the data processing hardware of the media device, from overlaying the first overlay content onto the media program to instead overlaying, onto the media program, second overlay content that is associated with the second viewer characteristic.

2. The method of claim 1, wherein the interactive overlay content is based on the fingerprint of the received media content.

3. The method of claim 1, wherein the interactive overlay content is randomly selected from an interactive overlay content database in communication with the data processing hardware of the media device.

4. The method of claim 1, wherein the interactive overlay content comprises a prompt for viewer information, the prompt comprises at least one of a quiz, a questionnaire, a survey, or a feedback form.

5. The method of claim 1, wherein the interactive overlay content is based on prior viewer information associated with the UID of the media device, the method further comprising updating, at the data processing hardware of the media device, the viewer information associated with the UID based on the feedback response of the overlaid interactive overlay content.

6. The method of claim 1 further comprising overlaying, by the data processing hardware of the media device, a targeted overlay onto the media content, the targeted overlay based on the viewer information associated with the UID of the media device.

7. The method of claim 1, wherein the interactive overlay content is based on the determined media program corresponding to the fingerprint of the received media content.

8. The method of claim 1, wherein determining the media program further comprises:
generating, by the data processing hardware of the media device, the fingerprint based on at least one frame of the media content, the generated fingerprint comprising channel information and time codes from the at least one frame; and
identifying, by the data processing hardware of the media device, the media program based on the channel information and the time codes of the generated fingerprint.

9. The method of claim 1, wherein associating the viewer information of the feedback response with the UID of the media device further comprises associating the determined media program with the UID of the media device.

10. The method of claim 1 further comprising generating, by the data processing hardware of the media device, a report based on the viewer information, the report configured to identify more than one viewer at the media device based on the viewer information associated with the UID of the media device.

11. A system comprising:
a media device comprising a unique identifier (UID);
data processing hardware located at the media device; and
memory hardware in communication with the data processing hardware, the memory hardware storing instructions that when executed on the data processing hardware cause the data processing hardware to perform operations comprising:
receiving media content from a content feed;
determining a media program associated with the received media content based on a fingerprint of the received media content; and
while the media program is being displayed by the media device:
overlaying interactive overlay content onto the media program of the media content in an overlay area, the overlay area corresponding to a spatial position within at least one frame of the media content;
overlaying first overlay content onto the media program of the media content, wherein the first overlay content is associated with a first viewer characteristic;
receiving a feedback response from a viewer based on the interactive overlay content;
determining viewer information from the feedback response of the viewer;
associating the viewer information of the feedback response with the UID of the media device;
determining that the viewer information associated with the UID of the media device indicates a second viewer characteristic that is different from the first viewer characteristic; and
in response to determining that the viewer information indicates the second viewer characteristic that is different from the first viewer characteristic, dynamically switching from overlaying the first overlay content onto the media program to instead overlaying, onto the media program, second overlay content that is associated with the second viewer characteristic.

12. The system of claim 11, wherein the interactive overlay content is based on the fingerprint of the received media content.

13. The system of claim 11, wherein the interactive overlay content is randomly selected from an interactive overlay content database in communication with the data processing hardware of the media device.

14. The system of claim 11, wherein the interactive overlay content comprises a prompt for viewer information, the prompt comprises at least one of a quiz, a questionnaire, a survey, or a feedback form.

15. The system of claim 11, wherein the interactive overlay content is based on prior viewer information associated with the UID of the media device and the operations further comprise updating the viewer information associated with the UID based on the feedback response of the overlaid interactive overlay content.

16. The system of claim 11, wherein the operations further comprise overlaying a targeted overlay onto the media content, the targeted overlay based on the viewer information associated with the UID of the media device.

17. The system of claim 11, wherein the interactive overlay content is based on the determined media program corresponding to the fingerprint of the received media content.

18. The system of claim 11, wherein determining the media program further comprises:
generating the fingerprint based on at least one frame of the media content, the generated fingerprint comprising channel information and time codes from the at least one frame; and
identifying the media program based on the channel information and the time codes of the generated fingerprint.

19. The system of claim 11, wherein associating the viewer information of the feedback response with the UID of the media device further comprises associating the determined media program with the UID of the media device.

20. The system of claim 11, wherein the operations further comprise generating a report based on the viewer information, the report configured to identify more than one viewer at the media device based on the viewer information associated with the UID of the media device.

21. A non-transitory computer readable medium having stored thereon instructions that, upon execution by a processor, cause performance of a set of acts comprising:

receiving media content from a content feed;

determining a media program associated with the received media content based on a fingerprint of the received media content; and while the media program is being displayed by a media device:

overlaying interactive overlay content onto the media program of the media content in an overlay area, the overlay area corresponding to a spatial position within at least one frame of the media content;

overlaying first overlay content onto the media program of the media content, wherein the first overlay content is associated with a first viewer characteristic;

receiving a feedback response from a viewer based on the interactive overlay content;

determining viewer information from the feedback response of the viewer;

associating the viewer information of the feedback response with a unique identifier (UID) of the media device;

determining that the viewer information associated with the UID of the media device indicates a second viewer characteristic that is different from the first viewer characteristic; and in response to determining that the viewer information associated with the UID of the media device indicates the second viewer characteristic that is different from the first viewer characteristic, dynamically switching from overlaying the first overlay content onto the media program to instead overlaying, onto the media program, second overlay content that is associated with the second viewer characteristic.

* * * * *